United States Patent Office 3,579,605
Patented May 18, 1971

3,579,605
ISOMERIZATION OF OCTALINS
Anthony L. Tumolo, Havertown, Pa., assignor to
Sun Oil Company, Philadelphia, Pa.
No Drawing. Filed Apr. 27, 1970, Ser. No. 32,436
Int. Cl. C07c 13/28
U.S. Cl. 260—666    6 Claims

ABSTRACT OF THE DISCLOSURE

An octalin is isomerized to another octalin, in particular, 1,9-octalin to 9,10-octalin, by contact with a catalyst combination comprising silica gel and a hydrogen halide, or sulfuric acid, or phosphoric acid.

BACKGROUND OF THE INVENTION

There are six known octalins, namely, (1) 9,10-octalin, (2) 1,9-octalin, (3) trans-1,2-octalin, (4) cis-1,2-octalin, (5) trans-2,3-octalin, and (6) cis-2,3-octalin.

Liquid mixtures of octalins can be produced in various ways, such as by the dehydration of 2-decalol. Various procedures for such dehydration are disclosed in articles by authors in publications as follows: W. P. Campbell et al., J. Am. Chem. Soc., 63, 2721 (1941); W. G. Dauben et al., J. Org. Chem., 23, 1205 (1958); and A. S. Hussey et al., J. Org. Chem., 26, 256–257 (1961).

In the latter will be noted the observation that the data for the acid-catalyzed equilibration of the 1,9-octalin and 9,10-octalin (e.g. with phosphoric acid) suggest that the apparent enrichment of 9,10-octalin is more likely the result of removal of the 1,9-octalin due to polymerization side reactions.

Equilibration of octalin mixtures using various other acidic reagents is dealt with in an article by J. W. Powell et al., Proc. Chem. Soc., p. 412 (1960). Also equilibration of octalins is dealt with in an article by P. Oberhänsli et al. in J. Chem. Soc. (B), pp. 467–471 (1969).

Another procedure for the production of octalin mixtures involves the dehydrohalogenation of monohalo-decahydronaphthalene. Production of the latter is disclosed in U.S. Pat. 2,629,748, issued Feb. 24, 1953, to F. E. Condon, and the product can be subjected to dehydrohalogenation by known procedures to yield octalin mixtures.

In such mixtures, 9,10-octalin and 1,9-octalin usually predominate (the former considerably over the latter), with at least some of the other octalins being present.

A very desirable octalin is 9,10-octalin, since it can be converted to sebacic acid by oxidation and reduction. An oxidation reaction is set forth in an article by W. Huckel et al. in Ann., 474, p. 125 (1929), to yield δ-keto-sebacic acid which by use of the Clemmenson reduction can be converted to sebacic acid.

Sebacic acid is useful, among other things, in the manufacture of synthetic resins of the alkyd or polyester type, of nonmigrating plasticizers, of polyester rubbers, and of synthetic fibers of the polyamide type.

SUMMARY OF THE INVENTION

The present invention is based upon the isomerization of an octalin to another octalin, for example, the isomerization to 9,10-octalin of octalin other than 9,10-, such as 1,9-octalin, without large or even significant loss of octalins by polymerization. The process involves treating an octalin material other than 9,10-octalin (which may or may not also be present in the starting material, if so in less than equilibrium concentration) with a catalyst combination comprising silica gel and a hydrogen halide or sulfuric acid or phosphoric acid, to yield an octalin product containing 9,10-octalin in enriched concentration.

DESCRIPTION

The hydrogen halide employed in the catalyst combination can be hydrogen chloride, hydrogen bromide, hydrogen iodide or hydrogen fluoride, although of these hydrogen chloride or hydrogen bromide or hydrogen iodide are preferred. Moreover, the hydrogen halide can be introduced as such into the reaction zone, or more conveniently, and preferably, in the form of a halogen halide-yielding substance of which chlorodecahydronaphthalene and tertiary butyl chloride are examples.

For convenience the term "decahydronaphthalene" is hereinafter designated "DCHN."

The phosphoric acids are acids of pentavalent phosphorous, and differ from each other in the number of molecules of water of hydration or constitution present. They can be considered as derivatives of phosphoric anhydride (phosphorous pentoxide $P_2O_5$) by the addition of various amounts of water; one molecule yielding metaphosphoric acid, two molecules yielding pyrophosphoric acid and three molecules yielding orthophosphoric acid. All three and $P_2O_5$ are solid at room temperature (20° C.). Accordingly, they are preferably applied in the form of concentrated aqueous solutions, $P_2O_5$ and the meta- and pyro-forms being thus successively converted to a higher water content and eventually to the ortho form, i.e. $H_3PO_4$, by addition of water.

On the other hand, water already in the reaction zone, such as adsorbed on the silica gel can be relied upon for solution purposes when solution is required or dilution is desired in the case of any of the treating agents to which this invention relates.

Separation of the reaction mixture from the catalyst combination, in which the acid adheres strongly to the silica gel, apparently by adsorption, can be accomplished by simple filtration. Separation of product octalin from the reaction mixture, usually after conventional neutralization treatment for removal of any residual acidity, can be accomplished in any desired manner, such as by distillation (e.g., at reduced pressure), whereupon unconverted feed octalin thus recovered can be, if desired, treated anew, e.g., recycled, with further production of isomerized octalin. Separations are, of course, made in vapor phase chromatography, even though on a limited scale. The above-mentioned articles by W. G. Dauben et al. and by A. S. Hussey et al. set forth procedure for separating 9,10-octalin from an octalin mixture through treatment to yield the nitroso chloride derivative of the 9,10-isomer which, after separation, is processed to yield, through regeneration, the olefin in virtually pure form.

Contacting of the octalin feed material with the catalyst combination of silca gel and hydrogen halide can be carried out in any suitable apparatus, such as a batch reactor, a fixed bed column or a continuous contractor. The process can be carried out at any desired pressure, atmospheric, above or below. Elevated pressure conditions can be required to maintain liquid phase reaction conditions under elevated temperature conditions. Moreover, in view of the tendency of olefins to oxygenate in air, air preferably is excluded, such as by the use of an inert atmosphere, e.g., of nitrogen, or of at least a closed container, to avoid or reduce possible significant reaction with oxygen. This may not be found necessary in all instances, but is much preferable.

Time, temperature and percent of catalyst are in themselves not particularly critical, and have a more or less normal relationship in that time of reaction is decreased with increase in temperature and/or percent of catalyst and vice versa, each preferably having a value high enough for practical purposes, as is well understood. Also as is well understood, temperature conditions preferably should not be so high nor time of reaction so long as to be be destructive of catalyst, reactants and/or product.

To illustrate, temperature conditions during reaction can be room temperature, above or below, e.g. 0° C. to 250° C. and particularly 0° C. to 200° C., consideration being given to the volatility of substances present in the reaction zone that should be maintained in liquid phase by increase in pressure. A good temperature range for practical purposes is 20–175° C. Since elevated temperature conditions are required to yield hydrogen halide from a hydrohalide yielding substance, elevated pressure conditions may be required to prevent volatilization of the hydrogen halide even though the silica gel has a strong affinity for the latter.

While the ratio of catalyst to octalin starting material can vary rather widely, the range of 0.01 to 2 by weight is within practical limits and particularly 0.1 to 2. The ratio of acid to silica gel also can vary rather widely with the acid adhering strongly to the silica gel.

Silica gel has a strong affinity not only for the acid treating agents of the invention, but also for water, and all of the treating agents are soluble in water. Since absolute anhydrous conditions are very difficult to maintain in an industrial system, it can be foreseen that in such instances of application of the invention, the treating agent will be present on the silica gel in admixture with water. This is the case, in any event, when phosphoric acid is employed at a temperature at which it is normally solid, as well as when other treating agents are employed in admixture with water, e.g., aqueous $H_2SO_4$, or aqueous hydrohalide. The concentration of acid in an aqueous admixture adhering to the silica gel preferably should be at least 40% by weight and more preferably at least 50% by weight.

Also the acid should be held tightly on the silica gel, so that there is no concentration of acid in the reaction zone, apart from the silica gel, capable of having a significant influence on the reaction.

While the use of a solvent for the octalin in the reaction zone is not required, such use is not by any means precluded. Suitable solvents are characterized by ability to dissolve octalins and by inertness for practical purposes in the reaction zone under the conditions of reaction. Examples of types of solvents which can be used are aromatics, paraffins, cycloparaffins or mixtures of such hydrocarbons with oxygenated polar solvents such as lower aliphatic acids, alcohols, esters and ethers. A specific example is 2 parts acetic acid and 1 part benzene by volume.

Octalin mixtures obtained by various methods frequently contain small amounts of inert DCHN which can serve as an internal standard in comparing the respective feed and product compositions obtained by vapor phase chromatographic analysis. If the feed does not contain any DCHN, then a small amount of DCHN, or of dodecane or other inert material, can be added for this purpose. In the practice of the invention, the internal standard concentrations do not increase significantly or at least not in large measure, which shows that there is no significant or large loss of octalins by side reactions, such as by polymerization to nonvolatile polymer.

Hydrohalide yielding substance are those capable of splitting off hydrogen halide at the temperature used in the reaction zone. Among such substances are the tertiary alkyl halides of which those having from 4–12 carbon atoms are examples. Of these the chlorides, bromides and iodides are preferred, and particularly the chlorides. Also included are the allyl halides in which the halogen atom is attached to a carbon atom next to a carbon atom of the double bond, with the same halide preferences as noted above. Cycloaliphatic halo compounds are also included, such as halocyclopentane, halocyclohexane and halogen-substituted DCHN, also with the same halide preferences as noted. Other halogen halide-yielding compounds will suggest themselves to persons skilled in the art.

The following examples are given by way of illustration.

EXAMPLE I

In this run an octalin mixture obtained by the dehydrochlorination of monochloroDCHN and containing upwards of 85% octalins was employed, of which 56% of said octalins was 9,10-octalin. This mixture also containing 0.6% chloroDCHN and 4.5% trans-DCHN, the latter serving as an internal standard. 2.0 ml. of this mixture was added to 0.2 g. of silica gel, followed by heating to 160° C. for 2½ hours to split off HCl from the chloroDCHN. The product contained 4.6% trans-DCHN, showing virtually no change in the internal standard, and 81% of the octalins present was 9,10-octalin.

EXAMPLES II to VI

Examples II to VI have been consolidated into the following Table I for better comparison of results. In these examples dodecane was incorporated in the starting mixture as an internal standard. Except in the case of 9,10-octalin and the internal standard, the chomographic separations were more or less rough as indicated. The composition of the starting mixture is shown in line one. In each of thes examples, 10% by weight of silica gel based on octalins present was added to the charge. In Example II no hydrogen halide was present during the reaction, while in the case of Examples III to VI 2% by weight chloroDCHN also based on octalins present was added as a hydrogen chloride source.

Two main points are clearly shown by the data. One is the increase in 9,10-octalin which resulted when hydrogen halide was present and a high enough reaction temperature was used, as shown particularly by Examples IV and V. The other is the virtually constant value of the internal standard, except in Example VI which demonstrates the results of excessive temperature-time treatment.

TABLE I.—OCTALIN ISOMERIZATIONS

| | | | Composition, weight percent | | | | |
|---|---|---|---|---|---|---|---|
| | Time, hrs. | Temp., °C. | Trans-DCHN[1] plus unidentified octalin | 1,9-octalin plus cis-DCHN[1] | 9,10-octalin | Unidentified octalin | Dodecane (internal standard) |
| Starting mixture | | | 4.1 | 33.5 | 47.4 | 1.1 | 13.9 |
| Example II [2] | 2.5 | 125 | 3.5 | 33.2 | 46.9 | 2.8 | 13.6 |
| Example III | 3.5 | 75 | 3.8 | 34.6 | 45.4 | 2.3 | 13.9 |
| Example IV | 2 | 100 | 3.5 | 28.3 | 51.5 | 2.8 | 13.8 |
| Example V | 2.5 | 125 | 3.6 | 22.2 | 59.1 | 0.9 | 14.2 |
| Example VI | 5.75 | 125 | 3.0 | 21.2 | 59.2 | 1.0 | 15.7 |

[1] DCHN=decahydronaphthalene.
[2] No HCl precursor used in this run.

It will be noted that in Examples II and III, no increase in 9,10-octalin was achieved. The explanation is that in Example II, only silica gel was present, and that in Example III, temperature-time conditions were not such as to adequately split off HCl from the chloroDCHN present.

Example IV had temperature-time conditions such as to show an improvement in 9,10-octalin yield, which reaches an apparent peak in Example V wherein such conditions were more vigorous than in Example IV. The excessive temperature-time conditions of Example VI yielded no significant increase in 9,10-octalin, and was accompanied by some loss of octalin as indicated by the moderate increase in the internal standard.

Examples I to VI serve to demonstrate not only the effectiveness of the hydrogen halide-silica gel combination as catalyst for the isomerization reaction, but also the reaction at elevated temperatures, the latter serving to release hydrogen halide from the halogen halide yielding substance present.

In the case of halogen halide per se, or sulfuric acid or phosphoric acid, use of a wide range of temperatures is available, including room temperature. This is demonstrated by Example VII which is submitted in the table form in Table II.

EXAMPLE VII

In Example VII, 1.5 ml. of octalin mixture, 0.5 g. silica gel and 0.0175 g. of $H_2SO_4$ of 96–98% concentration were reacted at room temperature for 4 hours. The composition of the starting material is shown in line one of Table II, and the composition of the product mixture is shown in line two.

TABLE II.—OCTALIN ISOMERIZATION VIA SILICA GEL-$H_2SO_4$

| | Composition, weight percent | | | |
|---|---|---|---|---|
| | trans-DCHN | cis-DCHN plus 1,9-octalin | 9,10-octalin | Dodecane (internal standard) |
| Starting mixture | 22.4 | 36.1 | 31.8 | 9.7 |
| Example VII | 21.0 | 17.8 | 51.2 | 10.0 |

When phosphoric acid is substituted for sulfuric acid or hydrochloric acid in practicing the invention, substantially analogous results are obtained. The effectiveness of the silica gel-acid combination of the invention is attributed to the moderating effect of silica gel on the acid which is held tightly on the silica gel. In fact a change in color of the silica gel to reddish pink was noted, indicating strong adsorption of acid.

The invention is applied to mixtures of octalins as starting material and is applicable to any such mixtures as are in other than a state of equilibrium irrespective of the forward direction of the reaction. In the case of the production of 9,10-octalin, the concentration of the latter in the starting material can vary between zero and equilibrium under the conditions of reaction. Also the octalin to be isomerized may be a single octalin, or a mixture of octalins in which the octalin to be isomerized is present in greater than equilibrium concentration under the conditions of reaction, which was the case with 1,9- octalin, and some of the other octalins, in the above examples.

The invention claimed is:
1. A process for the isomerization of an octalin to another octalin which comprises contacting said first-mentioned octalin with a catalyst combination comprising silica gel and an agent comprising a hydrogen halide or sulfuric acid or phosphoric acid, said agent adhering strongly to said silica gel.
2. The process of claim 1 for preparing 9,10-octalin which comprises contacting a liquid octalin feed mixture comprising 1,9-octalin in greater than its equilibrium concentration and 9,10-octalin in less than its equilibrium concentration with said catalyst combination, and recovering an octalin product containing 9,10-octalin in enriched concentration.
3. The process of claim 2 in which said agent is a hydrogen halide in which the halogen is chlorine, bromine or iodine.
4. The process of claim 3 in which the hydrogen halide is supplied by incorporating in the reaction mixture a small amount of organic halide which releases hydrogen halide in situ.
5. The process of claim 4 in which the hydrogen halide is hydrogen chloride.
6. The process of claim 2 in which said agent is sulfuric acid.

References Cited

W. G. Dauben et al.: J. Org. Chem., 23, 1205, 1958.
A. S. Hussey et al.: J. Org. Chem., 26, 256–7, 1961.
J. W. Powell et al.: Proc. Chem. Soc. p. 412, 1960.
P. Oberhänsli et al.: J. Chem. Soc., (B) 467–471, 1969.
W. P. Campbell et al.: J. Am. Chem. Soc., 63, 2721, 1941.

DELBERT E. GANTZ, Primary Examiner

V. O'KEEFE, Assistant Examiner